C. W. SHERWOOD.
FOLDING SEAT.
No. 63,315.        Patented Mar. 26, 1867.
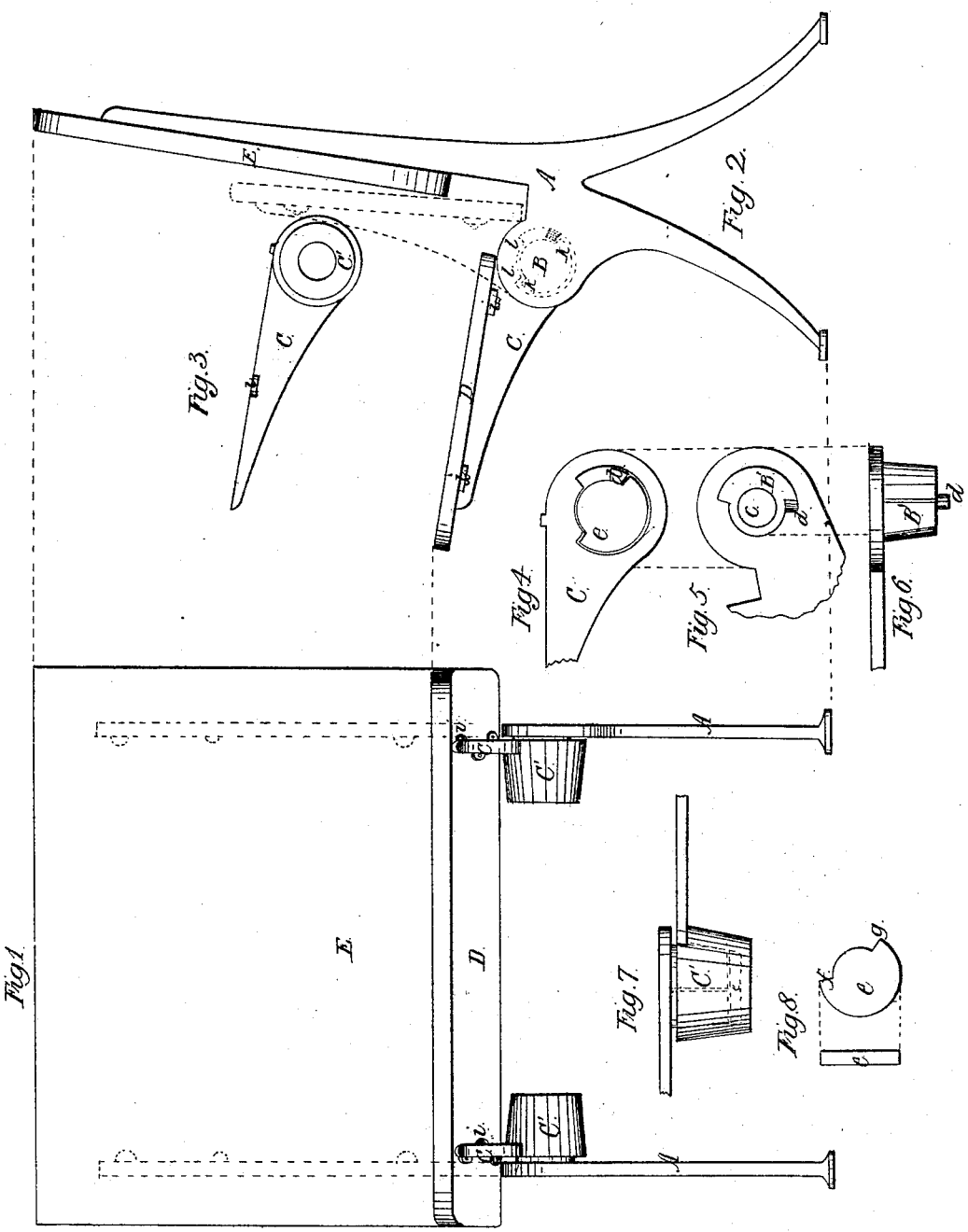
Witnesses:
T. Sayles
E. A. West
Inventor
C. W. Sherwood

United States Patent Office.

CALVIN W. SHERWOOD, OF CHICAGO, ILLINOIS.

*Letters Patent No. 63,315, dated March 26, 1867.*

---

IMPROVED FOLDING SEAT.

---

The Schedule referred to in these Letters Patent and making part of the same.

---

TO ALL WHOM IT MAY CONCERN:

Be it known that I, CALVIN W. SHERWOOD, of the city of Chicago, in the county of Cook, and State of Illinois, have invented certain new and useful Improvements in Folding Seats; and I do declare that the following is a full, clear, and exact description thereof, reference being had to the accompanying drawings, making a part of this specification, in which—

Figure 1 is a front view with the seat somewhat raised.

Figure 2, an end view.

Figure 3, an inside view of the seat arm.

Figure 4, an outside view of a portion of the seat arm with rubber in the nave, and showing the position of the rubber and lug, the seat being down.

Figure 5, an inside view of the axle as attached to the standard.

Figure 6, a top view of the axle.

Figure 7, the axle and nave together.

Figure 8, the form of rubber spring.

Like letters refer to like parts in all the figures.

Some of the objections to folding seats now in use are that when left in a raised position they are liable to be jostled down by the passing of persons through the aisles, making much noise; that they must be used with great care to prevent noise; that pupils can intentionally make a noise with them. The object of this invention is to obviate these objections and provide a noiseless folding seat. This invention is an improvement on the folding seat patented to me November 6, 1866, by Patent No. 59,466.

To enable others to make and use my folding seat, I proceed to describe its construction and operation.

The standards A I make of cast iron of proper size. A projection with a circular head, B, is cast as a part of the standard, at such distance from the bottom as will bring the seat to the required height. On the inside of this projection an axle, B', is cast, which projects at right angles with the side of the head B about three-fourths of an inch. This axle is made upon two circles having a common centre, one-half having a radius of about half an inch, and the other having a radius of about three-fourths of an inch, as shown in fig. 5, and by red lines in fig. 2. A lug, $d$, is placed on the lower portion of the axle, at that point where the larger part of the axle ends, which lug projects about one-fourth of an inch. The end of the axle is countersunk, as shown at $c$, for the purpose of receiving the compressed rubber, while a hole in the end of the nave C' answers the same purpose. To the axles B' are attached seat arms, C, by means of naves C', which are also made on two circles, internally; three-fourths of the distance around the circle is the same as the larger circle of the axle, and one-fourth the same as the smaller, so that when the nave is fitted on to the axle it can be turned only one-fourth of the distance around it. This arrangement of the axle and nave produces shoulders, $k$ and $l$, which operate as stops and hold the seat firmly when either up or down. If it is desired to make the seat stationary, a quadrant or wedge may be placed in the space, which cannot get out of place after the arms are fastened to the seat. By removing the arms the wedge can be taken out and the seat changed from a rigid to a folding seat. The seat is attached to the arms by means of screws through the brackets $i$. The back is similarly fastened to the standard. Noise can be partially prevented by attaching pieces of rubber or leather to the shoulders $k$. But to construct my folding seat so that it will be practically noiseless under all circumstances, I use a piece of rubber, or other suitable elastic material, about one-fourth of an inch in thickness, and of such size and form that it will fill the space between the bottom of the nave and the end of the axle when the axle is in place, the rubber being so cut as to allow the lug $d$ to pass.

In use the rubber $e$, fig. 8, is pressed to the bottom of the nave, the point $f$ touching the upper shoulder in the nave. When the seat is raised the point $g$ of the rubber will be against the lug $d$, which lug will be between the point $g$ of the rubber and the lower shoulder of the nave, and the rubber will not be at all compressed. When the seat is brought down the rubber will be compressed, the space between the upper shoulder of the nave and the lug, which is stationary, being diminished, and the seat must come to its place so gradually that there can be no noise or click by sudden contact of the shoulders of the nave and axle. I so fit and adjust the several parts that the ends of the axles press against the rubber at the bottom of the naves, while a small space is left between the naves and the circular heads B, consequently there can be no lateral motion of the seat, and the naves and heads B cannot come in contact and produce noise. The seat, also, when raised, will not be likely to be jostled down, the pressure of the rubber on the axles offering considerable resistance. A metallic spring may be used in the place of the rubber, though I prefer the rubber.

Having thus fully described my invention, what I claim as new, and desire to secure by Letters Patent, is—

The rubber spring $e$, or its equivalent, and the lug $d$, in combination with the axle $C'$ and nave $B'$, all constructed substantially as and for the purposes specified.

C. W. SHERWOOD.

Witnesses:
   T. SAYLES,
   E. A. WEST.